United States Patent
Hansen

(10) Patent No.: US 10,555,501 B2
(45) Date of Patent: Feb. 11, 2020

(54) COLLAR FOR MOUNTING AROUND THE NECK OF AN ANIMAL

(71) Applicant: Jørgen Kruuse A/S, Langeskov (DK)

(72) Inventor: Lone Bjerregaard Hansen, Odense S (DK)

(73) Assignee: Jørgen Kruuse A/S, Langeskov (DK)

( * ) Notice: Subject to any disclaimer, the term of this patent is extended or adjusted under 35 U.S.C. 154(b) by 288 days.

(21) Appl. No.: 15/515,355

(22) PCT Filed: Oct. 2, 2015

(86) PCT No.: PCT/DK2015/050298
§ 371 (c)(1),
(2) Date: Mar. 29, 2017

(87) PCT Pub. No.: WO2016/050250
PCT Pub. Date: Apr. 7, 2016

(65) Prior Publication Data
US 2017/0215380 A1 Aug. 3, 2017

(30) Foreign Application Priority Data
Oct. 3, 2014 (DK) .................. 2014 70610

(51) Int. Cl.
*A01K 13/00* (2006.01)
*A61D 9/00* (2006.01)
*A01K 27/00* (2006.01)

(52) U.S. Cl.
CPC .............. *A01K 13/006* (2013.01); *A61D 9/00* (2013.01); *A01K 27/001* (2013.01)

(58) Field of Classification Search
CPC ...... A01K 13/006; A01K 13/00; A01K 25/00; A01K 27/001
(Continued)

(56) References Cited

U.S. PATENT DOCUMENTS

| 5,349,927 A | 9/1994 | Campbell |
| 6,044,802 A * | 4/2000 | Schmid ................ A01K 13/006 |
| | | 119/856 |

(Continued)

FOREIGN PATENT DOCUMENTS

| EP | 0 468 697 B1 | 3/1995 |
| GB | 2503060 A | 12/2013 |
| WO | WO 02/069699 A2 | 9/2002 |

OTHER PUBLICATIONS

International Search Report from priority PCT Application dated Dec. 18, 2015.

(Continued)

*Primary Examiner* — Magdalena Topolski
(74) *Attorney, Agent, or Firm* — Woodard, Emhardt, Henry, Reeves & Wagner, LLP

(57) ABSTRACT

A collar for mounting around the neck of an animal, such as a dog, the collar including i) a first part with an inside for receiving the head of the animal, the first part having a flared shape, such as the shape of a truncated cone, and including a peripheral flexible wall defining the flared shape, the wall extending between a first opening leading into the inside and an opposite second opening leading into the inside, and ii) a second part joined to the first part at the second opening, the second part defining a sleeve for extending around the neck, wherein the peripheral flexible wall including a recess extending towards the first opening and defining an enlargement of the second opening.

17 Claims, 6 Drawing Sheets

(58) Field of Classification Search
USPC .............................. 119/815; D30/151, 152
See application file for complete search history.

(56) References Cited

U.S. PATENT DOCUMENTS

| | | | |
|---|---|---|---|
| 6,227,148 B1 * | 5/2001 | Wexler ................... | A01K 25/00 |
| | | | 119/837 |
| 6,659,046 B2 | 12/2003 | Schmid | |
| 6,925,966 B1 | 8/2005 | Wexler | |
| 7,523,720 B1 | 4/2009 | Lecy | |
| D632,851 S * | 2/2011 | Maroney ...................... | D30/145 |
| 8,181,609 B2 | 5/2012 | Ohashi | |
| 9,820,470 B1 * | 11/2017 | Hufstedler ............. | A01K 25/00 |
| 2004/0031448 A1 | 2/2004 | Trepanier | |
| 2007/0079767 A1 | 4/2007 | Albers | |
| 2011/0139091 A1 * | 6/2011 | Ohashi ................. | A01K 13/006 |
| | | | 119/821 |
| 2012/0145093 A1 * | 6/2012 | Martinez .............. | A01K 27/009 |
| | | | 119/863 |
| 2019/0104704 A1 * | 4/2019 | Zablow ................ | A01K 13/006 |
| 2019/0116757 A1 * | 4/2019 | Marcus ................ | A01K 13/006 |

OTHER PUBLICATIONS

Written Opinion from priority PCT Application dated Dec. 18, 2015.

\* cited by examiner

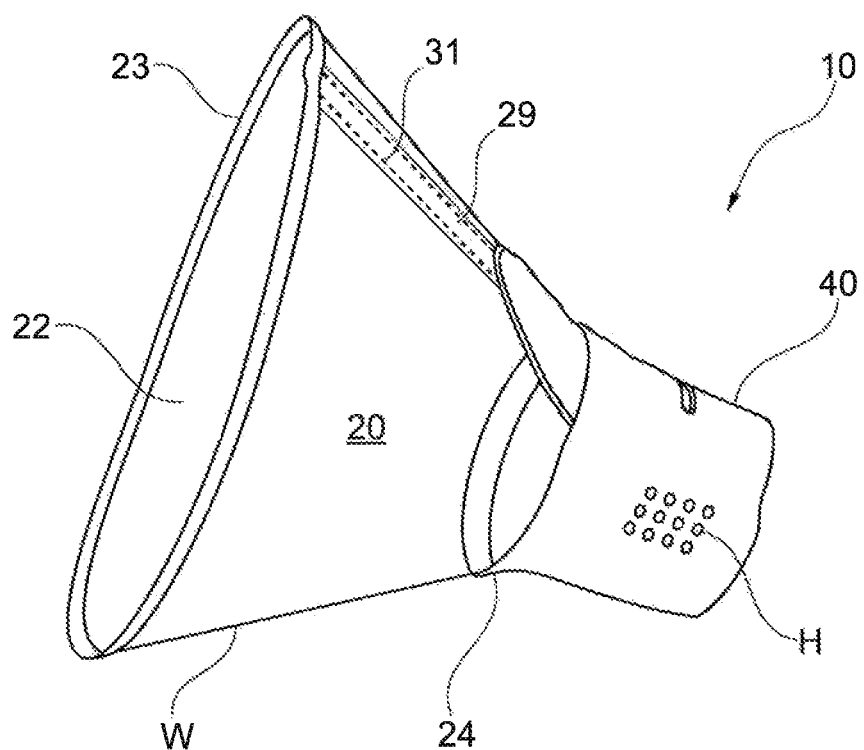
Fig. 1
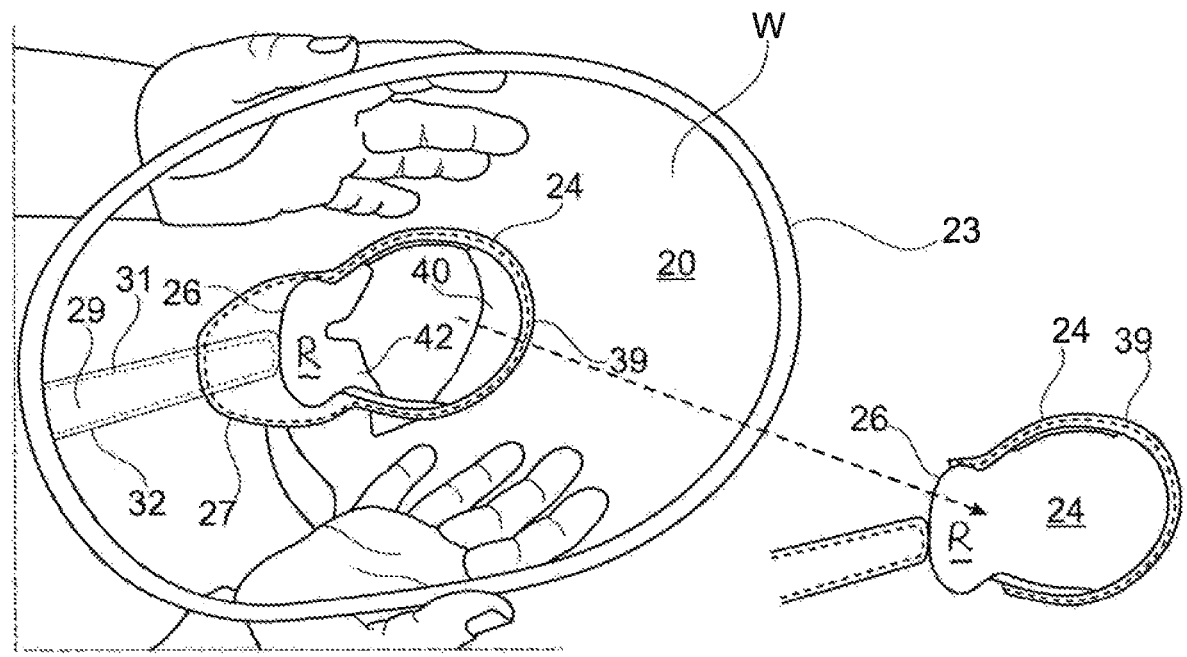
Fig. 2A
Fig. 2B

COLLAR FOR MOUNTING AROUND THE NECK OF AN ANIMAL

TECHNICAL FIELD

The present invention relates to a temporary, protective collar that can be applied to the neck of an animal to prevent contact between the animal's head and other parts of its body. The collar is useful, for instance, after surgery to allow wounds to heal or to allow topical medications to be applied in a manner that will not be disturbed by the animal.

In particular, the collar of the invention is of the type that includes a first part with an inside for receiving the head of the animal and having a flared shape, such as the shape of a truncated cone, with a peripheral flexible wall extending around the inside and defining the flared shape, the wall extending between a first opening into the inside and an opposite second opening into the inside, and a second part joined to the first part at the second opening and defining a sleeve for extending around the neck of the animal.

BACKGROUND ART

Protective collars, often called "Elizabethan" collars in view of the appearance that some have when in place, have long been used in veterinary medicine to protect against contact between an animal's head and other parts of its body. The collars are used, for instance, after surgery to prevent an animal from biting or chewing at dressings or areas below its neck, or from pawing or scratching at dressings or areas on or about its head.

Frequently such collars have taken the general form of truncated cones. Such collars have been closed and thereby retained in place around the animal's neck by such things as interlocking tabs, snaps, lacing, staples, and the like. Such collars frequently need to be offered in a variety of sizes or size ranges to accommodate animals of various sizes, and the effective size range of a particular collar is often limited by the closure mechanism used. Such closure mechanisms are also frequently cumbersome and time-consuming to use.

Examples of such collars include "Buster" disposable collars as shown by way of example in WO 95/22891.

Other devices along these lines have been described, for instance, in U.S. Pat. Nos. 3,013,530, 3,072,098, 3,036,554, 3,942,306, 4,328,605, 4,476,814 and 8,181,609.

What is needed is a collar that is quickly, easily, and accurately fittable and removable in a manner that will not cause trauma to the animal.

SUMMARY OF THE INVENTION

The present invention provides a novel protective collar which may be easily applied without causing trauma to the animal, even when the animal is lying on its side after surgery, and which may remain reliably in position after such placement. Preferably, the collar is supplied to the end-user in an assembled state, which does not require any further assembling before the collar is applied to the animal.

The above object is achieved in that the wall of the collar of the aforementioned type has a recess that extends towards the first opening and defines an enlargement of the second opening.

Thus, through the invention, by flattening the first part by hand, such as against a table on which the animal is lying, a relatively wide passage is provided through which the head as well as a portion of the neck of the animal may be passed without causing trauma to the animal; by the invention, pulling the flattened collar over the head of the animal can be done without meeting any significant resistance.

In one embodiment, the sleeve is an annular band formed of a stretchable material, which allows the sleeve to expand as the collar is pulled over the head of the animal. In another embodiment the second part is formed to selectively assume two different configurations, one wherein it assumes the shape of a sleeve for surrounding the neck of the animal, and another wherein the second part is sideways open, with a loose portion that is subsequently wrapped around a part of the neck of the animal such that the second part assumes the shape of the sleeve.

BRIEF DESCRIPTION OF THE DRAWINGS

In the following an embodiment of the invention will be described in more detail with reference to the drawings, wherein:

FIG. 1 shows a perspective side view of an embodiment of the present protective collar for mounting around the neck and head of an animal, FIG. 2a shows the collar of FIG. 1 in a temporary flattened state, FIG. 2b shows a portion of the collar of FIG. 2a, in an embodiment without a part thereof covering a recess formed in the wall.

DETAILED DESCRIPTION

Figure 3A:
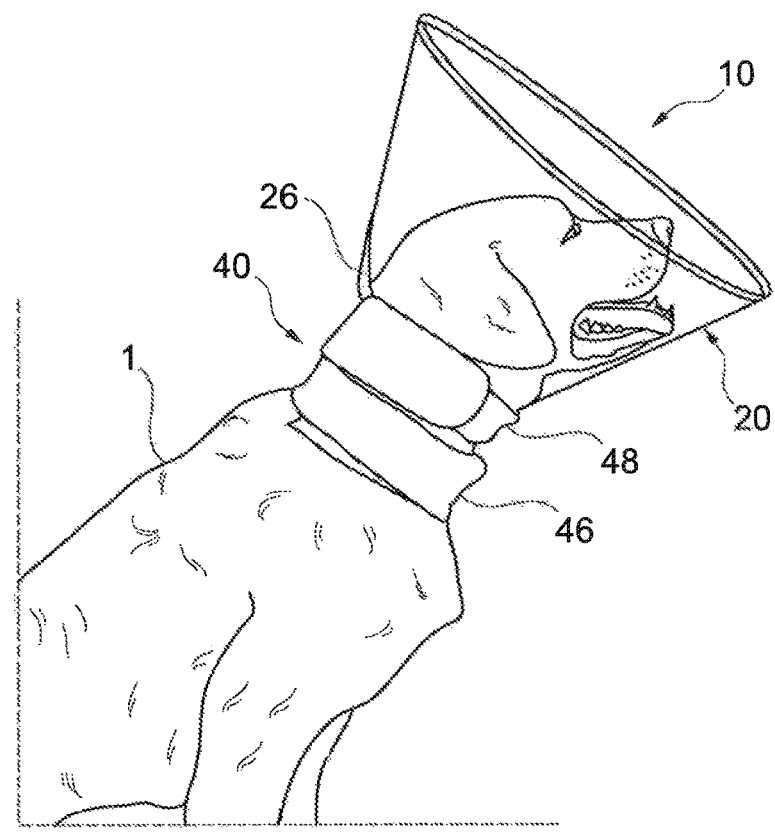
FIG. 3a shows the collar mounted onto a dog.

In FIG. 1 is shown a perspective side view of an embodiment of the present protective collar 10 for mounting around the neck and head of an animal; for the purpose of the following discussion the animal will be assumed to be a pet, such as a dog.

More specifically, the collar 10 comprises two parts, viz. a flared first part 20 joined to a sleeve-like second part 40. The first part 20 comprises a circumferential wall W which is flexible in nature and which defines an inside sized for receiving the head of the animal. The material of the flexible wall W is such that the first part 20 is elastically deformable, i.e. such that the first part 20 will seek to return to the its normal, flared shape after any reasonable deformation, in particular such as one arising from manual forces applied onto the first part 20. Preferably, the wall is transparent, allowing a person to see the head of the animal inside the first part 20.

At the base of the first part 20 shown to the left in FIG. 1 the first part 20 has a first opening 22 delimited by one peripheral edge 23 of the wall W and leading into the inside of the first part 20. A second opening 24 also leading into the inside is located opposite the first opening 22 and is delimited by another peripheral edge of the circumferential wall;

the second part 40 of the collar 10 is joined to the first part 20 at the second opening 24, and defines an extension of the first part 20. As will be understood, through the generally tapered or flared shape of the first part 20 the second opening 24 is smaller than the first opening 22.

In FIG. 1, the first part 20 is shown as having a hollow frusto-conical flared shape; other, similar hollow flared shapes may also be foreseen. Through the flexible nature of the peripheral/circumferential wall W a person manipulating the collar 10 may bring the first part 20 to temporarily assume a deformed flattened shape, as shown in FIG. 2a, in which the collar 10 may be easily pushed over the head and neck of the animal, as discussed further below. In the flattened state, the first opening 22 of first part 20 will tend to appear oval, in contrast to its normal circular or almost circular outline. FIG. 2b is an illustration where certain elements have been removed to allow the ovalised opening 24, with an extension thereof (discussed below), to be better discernible.

The collar 10 will normally be delivered from the factory to the end-user in a configuration wherein the first part 20 assumes the aforementioned flared shape; for this the wall W of the first part 20 may be a molded flexible plastic structure manufactured by injection molding using a mold having a flared cavity. Alternatively, the first part 20 may be factory-made on the basis of a flat plastic sheet which defines the peripheral wall W and which is bent so as to form a cone, after which overlapping edges of the plastic sheet are joined at overlap 29 in a permanent manner by gluing, welding or by stitches 31, 32, see FIG. 2a which also shows a protective soft lining applied to the wall W along the peripheral edge 23, as well as the other edge at opening 24. Such a bending, but without any permanent joining, is normally done by the end-user by prior art collars of the type shown, by way of example, in U.S. Pat. No. 8,181,609.

The second part 40 is joined to the first part 20 to as to form an extension thereof. More particularly, preferably the second part 40 is stitched or otherwise permanently joined to the first part 20 along the edge thereof that defines the aforementioned second opening 24. Stitch 39 along that edge and shown in FIG. 2a illustrates the connection between the first part 20 and the second part 40; as explained below, the second part 40 is, however, only joined to a portion of the perimeter of the wall W at the second opening 24.

Shown in FIGS. 2a and 2b is a recess R or cut-away portion of the wall W, the outline of which recess R is shown by numeral 26. The recess R extends in and along the flared wall W from the second opening 24 towards the first opening 22 and defines an enlargement of the second opening 24. As mentioned below, a patch 42 of a stretchable flexible material, such as a textile, may cover part of the aforementioned enlargement; FIG. 2b shows the opening 24 with the enlargement defined by recess R, without any patch 42.

Figure 3B:
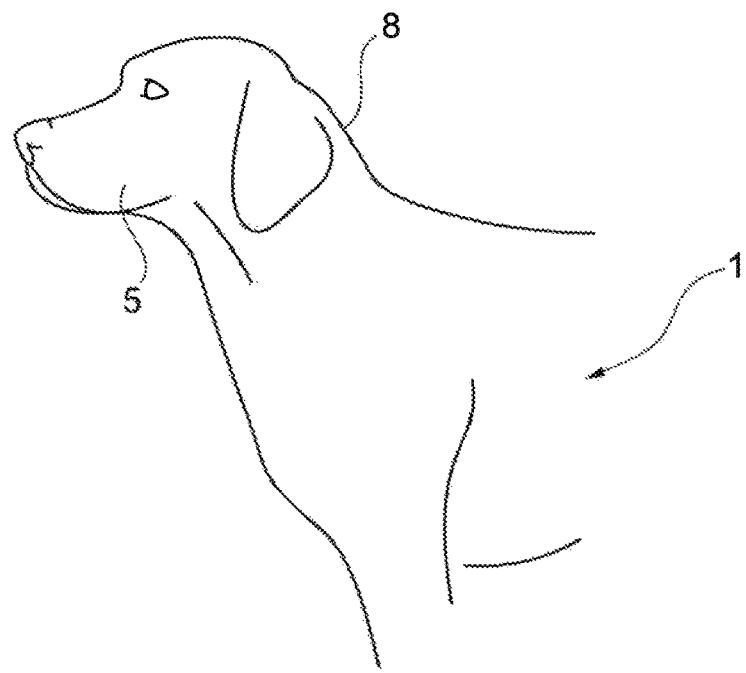
FIG. 3b shows certain anatomical features of a dog.

In FIG. 3b, a schematic view of a dog 1 is shown; the back of the neck 8 anatomically is often such that the neck in cross-section is more oval than circular. The present invention involves one particular advantage when the protective collar is applied when the animal is lying on its side after surgery; flattening the first part 20 by hand towards a table on which the animal 1 is lying provides a relatively wide passage defined by the opening 24 with the enlargement, through which passage the head 5 as well as a portion of the neck 8 of the animal 1 may pass without causing trauma to the animal 1. Thus, pulling the flattened collar 10 over the head 5 of the animal 1 can be done without meeting any significant resistance.

Figure 4A:
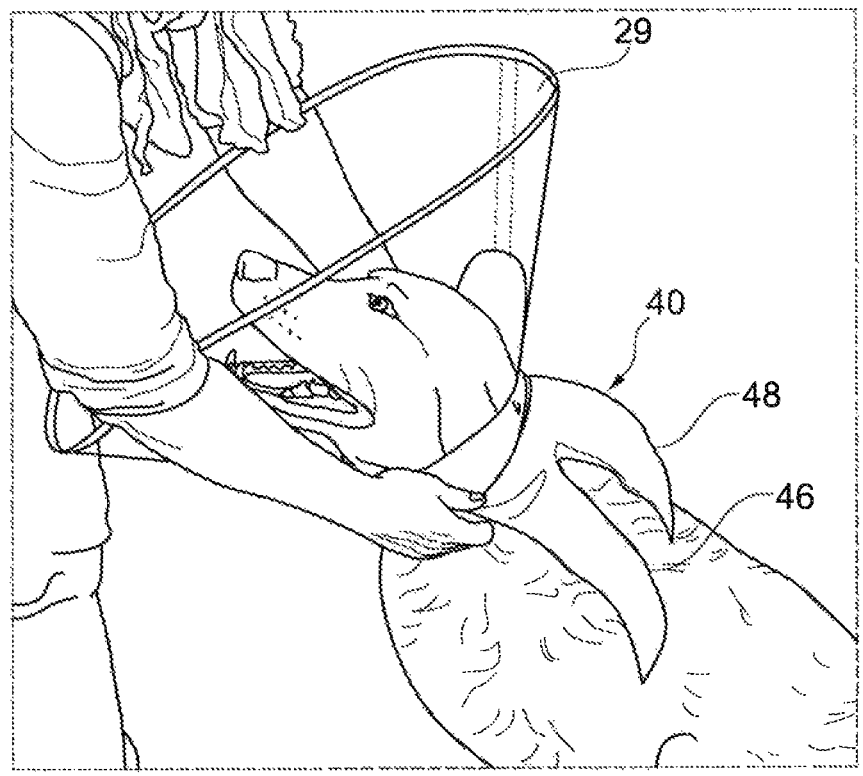
FIG. 4a shows the collar of FIG. 3a in a second configuration, before the second part is wrapped around the neck of the animal.
Figure 4B:
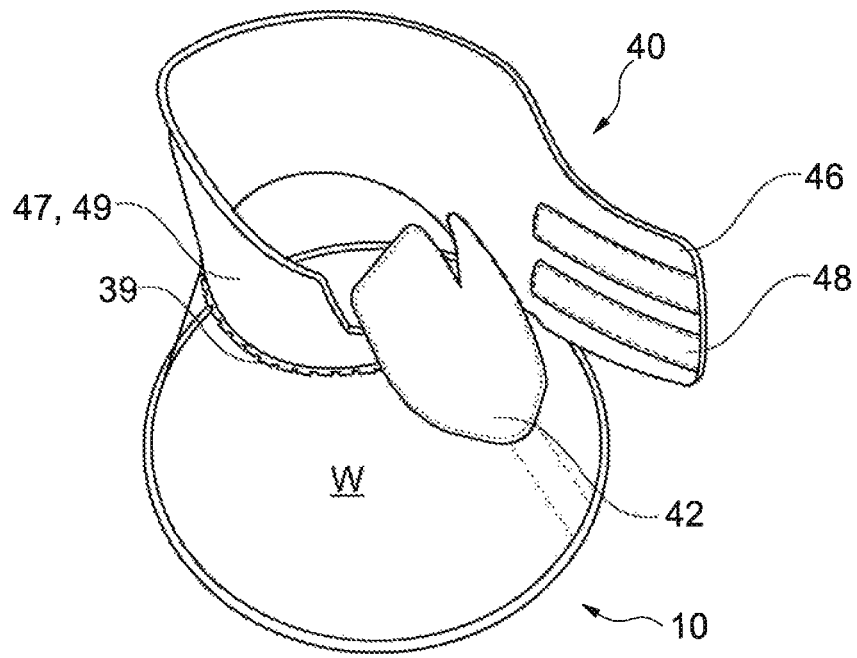
FIG. 4b shows the collar of FIG. 3a in the second configuration.

FIG. 1 shows the second part 40 according to one embodiment, in a first configuration forming a cylindrical sleeve, with through going holes H that may allow for a through-flow of air; in this first configuration the second part 40 serves to position and fix the collar 10 in relation to the animal which has its head 5 in the inside of the first part 20, as shown in FIG. 3a, by tightly surrounding the neck 8 of the animal 1. In contrast, in FIG. 4a the second part 40 of this embodiment is in a second configuration used when placing the collar 10 around the neck of the animal 1. FIG. 4b perhaps better shows the second part 40 in this second configuration; as seen, the second part 40 of this embodiment preferably comprises a preferably stretchable band joined to the first part 20 along a portion of the wall W, such as by the stitch 39, and having a free end 46, 48 which may be folded against an opposite end 47, 49 and fixed thereto, such as by Velcro, to define the first configuration. In the second configuration the band of the second part 40 may be placed freely around the neck of the animal 1; the stretchable band is not joined to the wall W in the area of the aforementioned recess R at opening 24 but will span around the entire second opening 24 when in the configuration shown in FIGS. 1 and 3a.

As will be clear to the skilled person the second part 40 may alternatively comprise an annular band of an elastically stretchable material attached to the edge defining the second opening 24, such as by the stitch illustrated by numeral 39 in FIG. 2b. Using such a band which is annular, i.e. preformed as a closed ring, may be preferable in some instances.

Figure 5A:
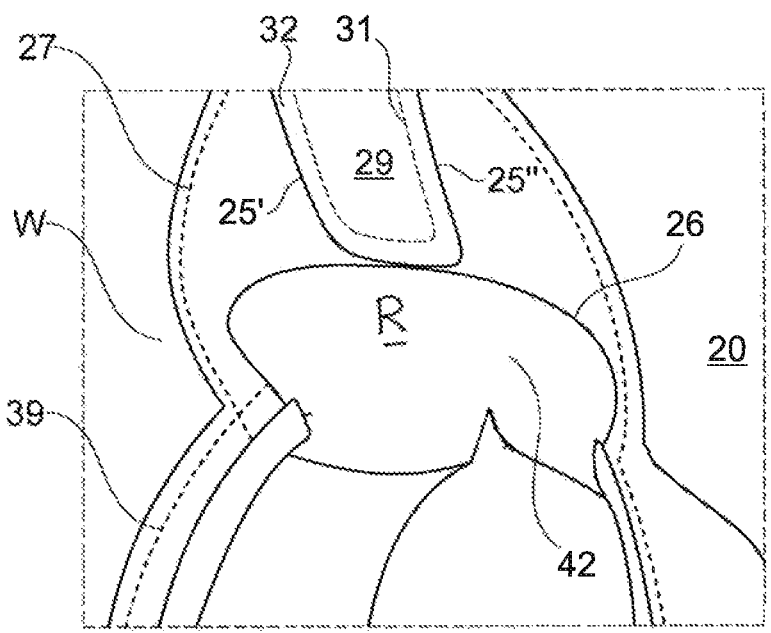
FIGS. 5a and 5b are enlarged inside and outside views, respectively, showing the collar in the area of recess formed in the wall of the collar.
Figure 5B:
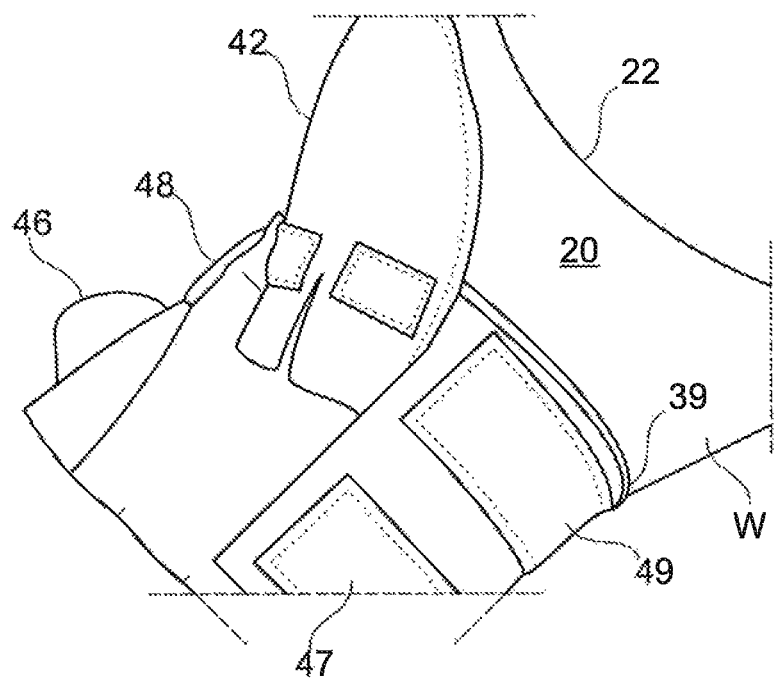

FIGS. 5a and 5b are enlarged inside and outside views, respectively, showing the collar 10 in the area of the aforementioned recess R having the general outline marked by numeral 26. A flexible stretchable patch 42 is preferably stitched or otherwise attached to the wall W along line 27 so as to cover the recess R. The patch 42 is covered by the free end 46 of the band of the second part 40 when the latter is in the first configuration and represents a safety measure by reducing the risk that an animal attempting to free itself from the collar 10 may introduce its hind paw into the inside of the collar 10 at the area of the recess. Velcro parts 49' may be applied to cooperate with the band.

Figure 6:
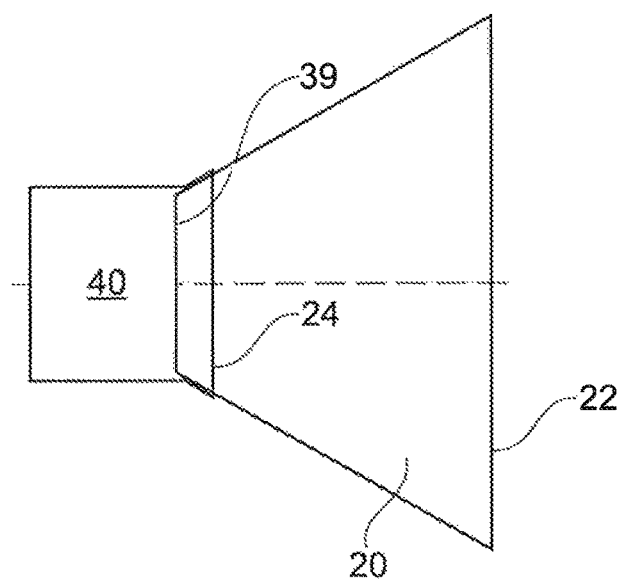
FIG. 6 is a schematic side view showing the fundamental constituents parts of the collar.
Figure 7A:
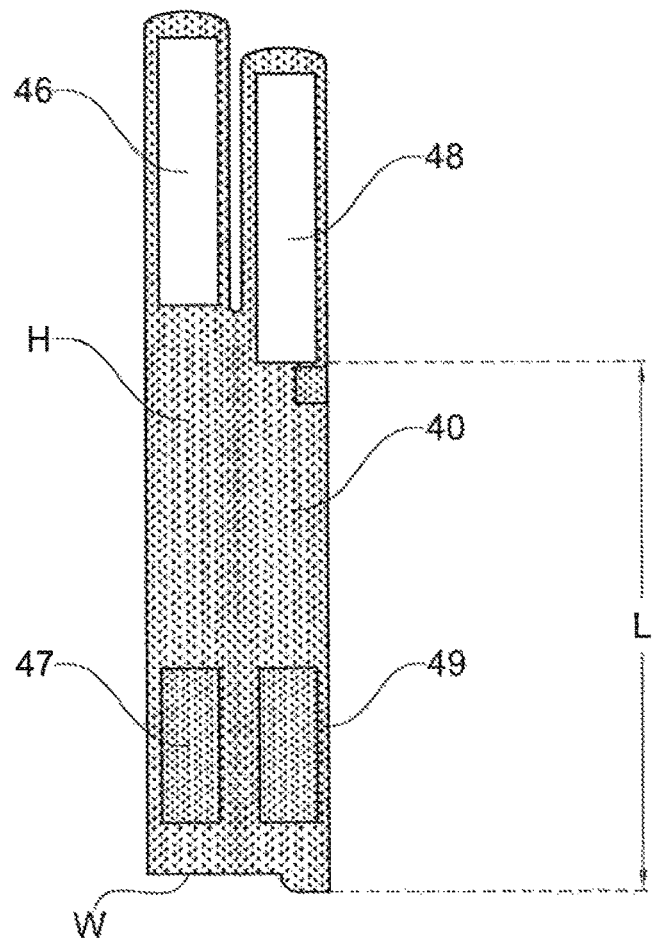
FIGS. 7a, 7b and 7c show the constituent parts of the described embodiment, ready for being shaped for subsequent assembly.
Figure 7B:
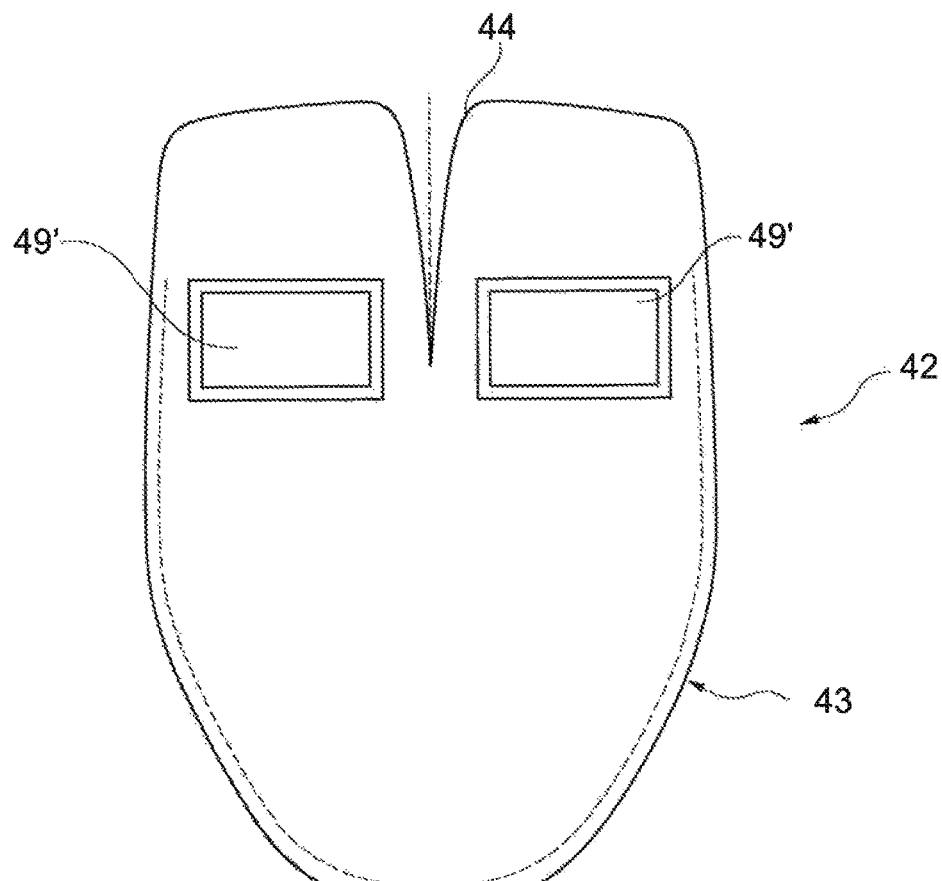
Figure 7C:
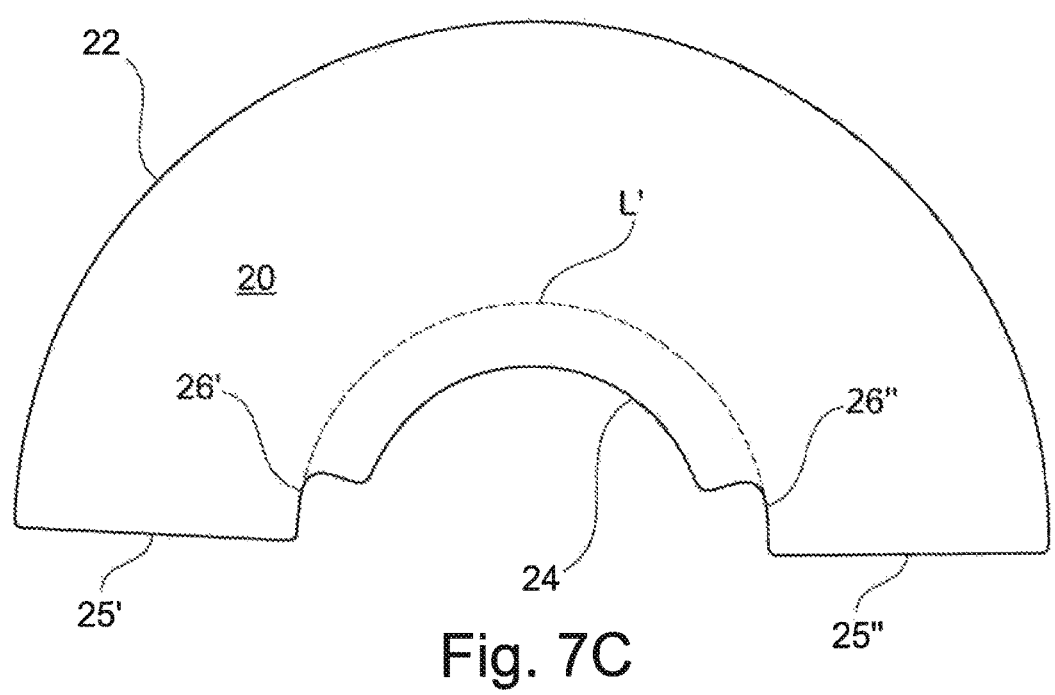

FIG. 6 is a schematic side view showing the fundamental constituents parts 20, 40 of the collar 10 of one embodiment. FIGS. 7a-7c show the constituent parts of the described embodiment ready for being shaped and assembled at the factory, namely the flat band defining the second part 40, the flat patch 42 and a flat flexible sheet of a plastic material defining the wall W after having been bent or rolled into the desired flared shape of the first part 20. The band has a first portion of length L which is joined to the wall W along arc of length L' shown in FIG. 7c. FIG. 7c shows the plastic material sheet with edges 25, 25" configured to subsequently overlap, curved edges defining the openings 22, 24, and cut-away portion with respective edges 26', 26" defining the recess R after bending/folding of the plastic sheet.

Materials for the collar may, by way of example be: flexible plastic sheet forming the first part 20: transparent PP second part 40, and patch 42: perforated neoprene.

Although not shown in the drawings, for the purpose of reinforcement the band forming the second part 40 may be provided in the area of the edges with a narrow elastic padding in the form of a material strip bent as a U and attached to the band so as to extend along the edges thereof shown in FIG. 7a.

The invention claimed is:

1. A collar for mounting around a neck of an animal, said collar including:
   i) a first part with an inside for receiving the head of said animal, said first part having a flared shape, and including a peripheral flexible wall defining said flared shape, said wall extending between a first opening leading into said inside and an opposite second opening leading into said inside, and
   ii) a second part joined to said first part at said second opening, said second part defining a sleeve for extending around said neck,
   wherein said peripheral flexible wall includes a recess extending towards said first opening and defining an enlargement of said second opening,
   wherein said second part is configured to extend around said neck in a first configuration, and said second part is configured to be open in a second configuration which permits a head of the animal to pass through the second opening to said inside of said first part,
   wherein said second opening and said recess define a contiguous aperture adapted to allow a head of the animal to pass through said second opening and said recess,
   wherein said second part has a loose portion that is configured to be selectively wrapped around a part of the neck of the animal; and
   wherein said second part comprises a stretchable material, said second part having a first portion having a length joined to said wall along a length thereof at said second opening, and a second portion with a free end selectively connectable to said first portion to define said first configuration.

2. The collar according to claim 1, said first part being formed by bending a flexible sheet having outer and inner arcuate edges defining said first opening and said second opening, respectively.

3. The collar according to claim 1, said first part further comprising a permanent connection connecting overlapping edges of said peripheral flexible wall.

4. The collar according to claim 3, said permanent connection being formed by welding, gluing or stitching.

5. The collar according to claim 1, further comprising a patch, being joined to said flexible wall and covering said recess.

6. The collar according to claim 5, wherein the patch is made from a stretchable material.

7. The collar according to claim 1, said first part being formed by bending a flexible sheet having outer and inner arcuate edges defining said first opening and said second opening, respectively.

8. The collar according to claim 7, said first part further comprising a permanent connection connecting overlapping edges of the bent flexible sheet.

9. The collar according to claim 8, said permanent connection being formed by welding, gluing or stitching.

10. The collar according to claim 9, further comprising a patch, being joined to said flexible wall and covering said recess.

11. The collar according to claim 10, wherein the patch is made from a stretchable material.

12. The collar according to claim 1, wherein the collar is configured and arranged to mount around the neck of a dog.

13. The collar according to claim 1, wherein said first part has the shape of a truncated cone.

14. The collar according to claim 1, wherein, in said first configuration and in said second configuration, said first part defines a shape of a truncated cone.

15. The collar according to claim 14, wherein, in said first configuration, said second part defines a cylindrical sleeve that extends away from said first part.

16. A collar for mounting around a neck of an animal, said collar including:
   a first part with an inside for receiving the head of said animal, said first part having a flared shape and including a peripheral flexible wall defining said flared shape, said wall extending between a first opening leading into said inside and an opposite second opening leading into said inside,
   a second part joined to said first part at said second opening, said second part defining a sleeve for extending around said neck, wherein said peripheral flexible wall includes a recess extending towards said first opening and defining an enlargement of said second opening, and
   a patch joined to said flexible wall and covering said recess.

17. The collar according to claim 16, wherein said second part comprises a stretchable material, said second part having a first portion having a length joined to said wall along a length thereof at said second opening, and a second portion with a free end connectable to said first portion to define said first configuration.

* * * * *